Feb. 10, 1953  S. A. SIMON ET AL  2,627,901
ASTATIC VEHICLE SEAT
Filed June 11, 1948

INVENTORS
SIMON A. SIMON.
ARTHUR H. DRELICH.
BY
J. L. Chisholm
ATTORNEY

Patented Feb. 10, 1953

2,627,901

UNITED STATES PATENT OFFICE 2,627,901

ASTATIC VEHICLE SEAT

Simon A. Simon, Longmeadow, and Arthur H. Drelich, Springfield, Mass., assignors, by mesne assignments, to Chicopee Manufacturing Corporation, Chicopee Falls, Mass., a corporation of Massachusetts Application June 11, 1948, Serial No. 32,519
In Canada June 4, 1948

9 Claims. (Cl. 155—182)

This invention relates both to passenger vehicles and to seats, particularly to seats in such vehicles, especially automobiles. Its objects are in general to provide improved seat surfaces or coverings which do not generate or induce static electrical charges, and thus to eliminate or reduce the generation of static electricity in passenger vehicles.

Upholstered seats, especially in automobiles, are frequently covered with material intended to be durable, water resistant and easily cleanable. In recent years much effort has been directed to the provision of seat cover materials and textiles which have the desirable properties of strength, flexibility, softness, comfortable feel, great durability under extreme abuse and high resistance to chemical action. An outstanding material developed by this effort is saran. We understand the material known commercially by this name to be technically either polyvinylidene chloride or a copolymer of vinylidene chloride with vinyl chloride and/or acrylonitrile, in any case suitably combined with one of various plasticizers to impart the desired physical properties to the copolymer. Such material, and the method of making it, are well known. It is commonly extruded into filaments which are woven into textiles, or the material may be formed as sheets and used as artificial leather. The commercial saran has a very smooth surface and is extremely inert chemically, making it highly resistant to soiling and easily cleanable, and this combined with its particular physical properties would make it an excellent seat covering material were it not for its inherent undesirable electrical properties.

Rubbing saran lightly with common textile materials ordinarily used for clothing, e. g. cotton or wool, generates or induces heavy static electrical charges. Thus when the clothing of a person is brushed over a seat covered with saran a heavy electrical charge is generated, resulting in one charge on the saran and an equal and opposite charge on the person. Thereafter if the person approaches a grounded conductor, such as a water pipe, or a conducting mass of sufficient electrical capacity which is either not charged or is carrying a charge of opposite polarity or sign, (e. g. an isolated steel table top) a spark passes between the person and this other object. The accompanying shock is startling, uncomfortable, frequently painful, and the spark may even be dangerous.

The phenomenon of static discharge or sparking due to seat covers is especially aggravated in the case of passengers in automobiles. We believe this may be due either to excessive friction caused by passengers sliding across seats and their backs in getting into or out of cars, or to the excessive friction caused by passengers' clothing unavoidably sliding over the backs of seats in the course of uneven motion of the vehicle, or to both of these causes, combined with the condition that the passenger is normally held by the seat out of electrical contact with the large metallic masses of the car, such as frame and body which have substantial electrical capacity, and which may either be isolated or insulated in space by the tires, if dry, or may be electrically connected to the ground if the tires are wet. There is also some evidence that static is caused by simple operation of the vehicle over a smooth road. This may conceivably be due to wind friction or tire friction. In any case, after a brief period of operation of a vehicle equipped with seats covered with saran, frequently a very heavy charge is built up on the bodies of passengers and this electrical charge may be discharged or conducted away from the passenger through a spark whenever the passenger becomes connected to the body of the car, as by touching a door handle, or when the passenger steps out on the ground.

The phenomenon of electrostatic charges and sparking also occurs in seat covers of other so-called plastic dielectric materials, for example polyethylene.

As used herein astatic means incapable of generating, inducing, or accumulating objectionable electrostatic charges, and antistatic means having the property of reducing or eliminating the ability to generate, induce or accumulate electrostatic charges. Thus an antistatic agent tends to produce an astatic result.

Our invention is based on our discoveries that long chain fatty acid partial esters of hexitol anhydrides and hydroxy-polyoxyethylene ethers thereof, herein for convenience called esters and ethers, adhere to or combine with (not necessarily in the chemical sense) various dielectrics and with them provide a combination having astatic properties; that certain of these esters and ethers, while soluble or readily dispersible in water, remain in combination with the dielectrics and provide astatic properties which are highly resistant to scrubbing in water; and that these esters and ethers surprisingly cooperate with excessively smooth and inert dielectric substances to produce the effects enumerated.

Based on these discoveries, it is among the objects of our invention to provide improved seat cover material and improved seats which do not shock people using them, and particularly to provide improved automobiles having seats covered with saran which does not shock passengers.

Figure 1:
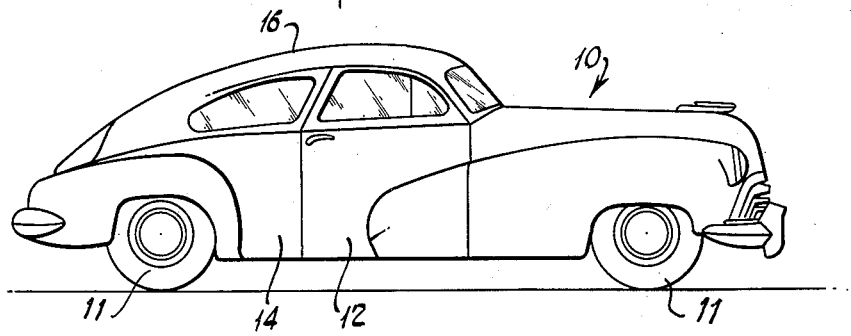
Fig. 1 is an elevation of an automobile embodying our invention.
Figure 2:
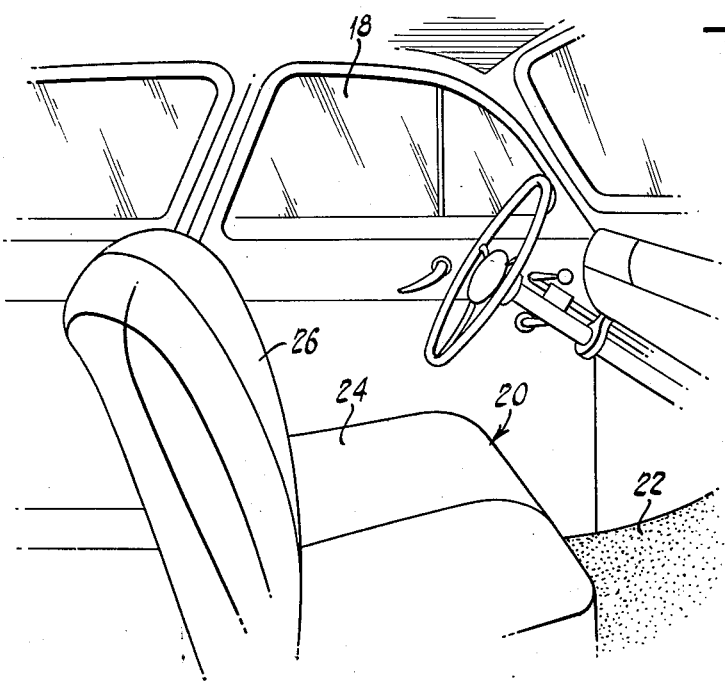
Fig. 2 is an enlarged perspective view of a portion of a seat embodying our invention.
Figure 3:
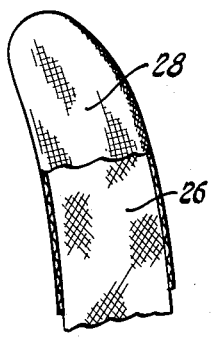
Fig. 3 is an enlarged elevation partly in section of a portion of a seat showing our improved seat facing material.

In Figs. 1 and 2, 10 represents a conventional automobile normally held out of electrical contact with the ground by tires 11 and having large masses of metal such as doors 12, body panels 14 and top 16 which enclose a passenger compartment 18 having one or more upholstered seats 20 and an insulating floor covering 22. The seat 20 includes an upholstered seat proper 24 and upholstered back rest 26. As described, the construction and arrangement are well known and their particular features are matters of choice.

In accordance with our invention we cover the operative or passenger supporting faces of the seat and back rest with saran or polyethylene, for example, either in the form of a sheet (that is a thick film) or preferably in the form of a closely woven but pervious textile cloth 28. One fabric which we have found suitable is woven as closely as is practical from extruded single filaments of about ten to twelve mils diameter. This sheet or cloth may be applied to the seat and back in any suitable or conventional manner, either as the permanent facing when the seat is constructed, or as a removable covering or slip cover.

At any suitable time before the car is used, and preferably before forming the cloth into seat covers, the surface of the dielectric material of which the cloth is made is covered with one of the antistatic esters or ethers referred to. This can be done by dipping, spraying or brushing with a dilute dispersion of the ester or ether in a suitable carrier, such as water, alcohol, carbon tetrachloride or other suitable dispersant or solvent. Water is preferred. We have found the following esters to be suitable antistatic agents for the purposes of our invention: the monolaurate, monostearate, mono-oleate, and trioleate of sorbitan and various hydroxy-polyoxyethylene ethers thereof. The hydroxy-polyoxyethylene ethers of these esters can be prepared by reacting the partial ester with a preformed polyethylene glycol or with 10 to 30 mols of ethylene oxide. Such reaction products are known in the literature and are named, for example, "reaction products of sorbitan monolaurate with 20 mols ethylene oxide," or more simply, "sorbitan monolaurate polyoxyethylene ether." Particular examples of the ethers of the fatty acid partial esters of the hexitol anhydrides include the polyoxyethylene ethers of the monolaurate, monostearate, mono-oleate, and tri-oleate of sorbitan.

We have found surprisingly that the antistatic esters and ethers adhere to the dielectrics over long periods of time and may fairly be said to give the dielectric a permanent astatic finish. We have also found that minute quantities of these antistatic agents impart this astatic quality. We have also discovered that while saran, polyethylene and other materials are extremely smooth and chemically inert, these esters and ethers surprisingly form stable astatic combinations with these plastics. In particular we have discovered that the combination of saran and sorbitan monolaurate resists to a high degree both abrasion and repeated scrubbing with a stiff bristle brush and soap solution. These results and these properties are contrary to what is to be expected from the individual properties of the saran and sorbitan monolaurate. Thus saran is known for its very smooth surface and high degree of chemical inertness. Consequently heretofore it has been difficult or impossible to combine anything with saran or to make anything adhere to it. Also while sorbitan monolaurate is regarded as insoluble in water, it is readily dispersible. Consequently it is contrary to the known properties both of saran and sorbitan monolaurate that they form a combination and that this combination resists separation by active scrubbing.

Figure 4:
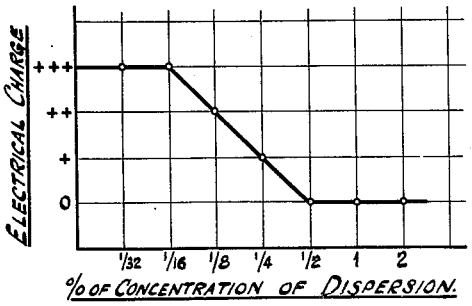
Fig. 4 is a chart on which are plotted the preferred concentrations of the dispersions of material used to impart astatic properties to the seat facing material.

Moreover very small quantities of the ester or ether produce a stable astatic combination with dielectric materials. We have found that a concentration of more than $\frac{1}{16}\%$ of sorbitan monolaurate in the treating dispersion, for example, is required to produce any important astatic effect, but that the maximum benefit can be derived from concentrations of less than 1%. In Fig. 4 is plotted the range of concentrations of a water dispersion of sorbitan monolaurate which are effective to render the saran astatic. In this figure $+++$ indicates a heavy charge; $++$ indicates a moderate charge; $+$ indicates a very slight charge; and 0 indicates no charge as measured on an electroscope brought near a sample of saran fabric which has been briskly rubbed with wool cloth. As will be seen from the diagram the dispersion of $\frac{1}{8}$ of 1% markedly reduces the static charge that can be induced on the saran, while immersion in a dispersion of $\frac{1}{2}\%$ and subsequent drying eliminates static completely. We have found that the value $(+)$ representing a slight charge is unobjectionable and that an automobile seat treated with a dispersion of $\frac{1}{4}\%$ prevents or limits the formation of static to a satisfactory degree.

When applied to textile fabrics woven from single filaments of about ten or twelve mils diameter, the above dispersions, after drying, increase the weight of the fabric by about one-third of the percentage of the concentration of the dispersion. Thus the treatment with a dispersion of $\frac{1}{2}\%$ increases the weight of the fabric about $\frac{1}{6}\%$.

We do not know the exact nature of the resulting dielectric treated with the antistatic ester or ether. Apparently evaporation of the carrier from the dispersion does not leave a simple film or coating which can be identified and described as such. And as yet we have no positive evidence that there is any chemical combination between the dielectric and ester or ether. The only way we can define the treated combination of saran and sorbitan monolaurate, for example, is to say that this combination has electrical properties substantially identical with saran which has been covered with a dispersion of sorbitan monolaurate and then dried.

As indicated by Fig. 4, concentrations of sorbitan monolaurate greater than 1% satisfactorily eliminate static, but we have found that concentrations above about 2% give the saran fabric an objectionable feel. Therefore we use concentrations within the range ⅛% to 2% and prefer to use between ¼% and 1%.

*Example I*

A saran cloth finely woven from single filaments having a diameter of 10 to 12 mils was dipped in a 1% dispersion of sorbitan monolaurate and dried. The resulting treated cloth showed no static by the electroscope when vigorously rubbed with woolen cloth. The fabric was applied to the seat of an otherwise conventional automobile, which was operated with two passengers under conditions known to develop objectionable static in untreated saran seats. The seat developed no static in operation. The seat cover was scrubbed vigorously with soap solution and a stiff brush. After four repeated scrubbings the seat developed no static in operation and samples showed no charge on the electroscope when briskly rubber with woolen cloth.

*Example II*

A saran cloth finely woven from single filaments having a diameter of 10 to 12 mils was dipped in a ½% dispersion of sorbitan monolaurate and dried. The resulting treated cloth showed no static by the electroscope when vigorously rubbed with woolen cloth. The fabric was applied to the seat of an otherwise conventional automobile, which was operated with two passengers under conditions known to develop objectionable static in untreated seats. The seat developed no static in operation. The seat cover was scrubbed vigorously with soap solution and a stiff brush. After four repeated scrubbings the seat developed no static in operation and samples showed no charge on the electroscope when briskly rubbed with woolen cloth.

While the esters and ethers listed are antistatic and render various dielectrics completely astatic, there is considerable difference in the resistance to washing and scrubbing of the astatic properties produced by the various esters and ethers. The astatic properties imparted by some are readily destroyed by a single scrubbing. Others will resist one laundering. However, sorbitan monolaurate has been found to impart an astatic property which resists repeated vigorous scrubbings.

Since there is a difference in the durability of the resulting astatic properties, it may be advisable to use more concentrated dispersions of particular esters and ethers in particular cases, for example, up to 5% where this does not produce an objectionable feel to the surface treated.

*Example III*

A saran cloth finely woven from single filaments having a diameter of 10 to 12 mils was dipped in a 1% dispersion of the reaction product of sorbitan monostearate with 20 mols ethylene oxide and dried. The resulting treated cloth showed no static charge by the electroscope when vigorously rubbed with woolen cloth. The fabric was applied to the seat of an otherwise conventional automobile which was operated with two passengers under conditions known to develop objectionable static in untreated seats. The seat developed no objectionable static in operation. The seat cover was scrubbed vigorously with soap solution and a stiff brush. Thereafter the seat cover showed observable amounts of static on the electroscope, but developed no objectionable static in operation. After a second laundering the seat developed objectionable static in operation.

The invention claimed is:

1. In a seat, the combination of means for supporting a person and a saran cover for the supporting means, the cover for the supporting means being treated and covered with an antistatic agent selected from a class consisting of long chain fatty acid partial esters of hexitol anhydrides and hydroxy-polyoxyethylene ethers of long chain fatty acid partial esters of hexitol anhydrides; whereby it is substantially incapable of generating, inducing, and accumulating objectionable electrostatic charges; the antistatic agent being resistant to separation from the saran cover by scrubbing in water.

2. In a seat, the combination of means for supporting a person and a saran cover for the supporting means, the cover for the supporting means being treated and covered with a dilute dispersion of sorbitan monolaurate, whereby it is substantially incapable of generating, inducing, and accumulating objectionable electrostatic charges; the sorbitan monolaurate being resistant to separation from the saran cover by scrubbing in water.

3. In a seat, the combination of means for supporting a person and a saran cover for the supporting means, the cover being treated and covered with a dispersion containing an amount within the range of from ¼% to about 1% of an antistatic agent selected from the class consisting of long chain fatty acid partial esters of hexitol anhydrides and hydroxy-polyoxyethylene ethers of long chain fatty acid partial esters of hexitol anhydrides, whereby it is substantially incapable of generating, inducing, and accumulating objectionable electrostatic charges; the said antistatic agent being resistant to separation from the saran cover by scrubbing in water.

4. In a seat, the combination of means for supporting a person and a saran cover for the supporting means, the cover for the supporting means being treated and covered with an aqueous dispersion containing an amount within the range of from about ⅛% to about 2% of sorbitan monolaurate and dried, whereby it is substantially incapable of generating, inducing, and accumulating objectionable electrostatic charges; the sorbitan monolaurate being resistant to separation from the saran cover by scrubbing in water.

5. In a seat, the combination of means for supporting a person and a cover of textile fabric woven saran for the supporting means, the cover for the supporting means being treated with sorbitan monolaurate, whereby it is substantially incapable of generating, inducing, and accumulating objectionable electrostatic charges; the said combination being dry to the touch, the said sorbitan monolaurate being resistant to separation from the saran cover by scrubbing in water.

6. In a seat, the combination of means for supporting a person and a cover of textile fabric woven saran for the supporting means treated and covered with an amount within the range of from about ¼% to about ⅔% of sorbitan monolaurate based on the weight of the saran, whereby it is substantially incapable of generating, inducing, and accumulating objectionable electrostatic charges; the sorbitan monolaurate being resistant to separation from the saran cover by scrubbing in water.

7. The combination of a passenger vehicle, a seat, and passenger-supporting saran cover for the said seat, the saran cover for the seat being treated and covered with sorbitan monolaurate.

8. In a passenger vehicle the combination of means for supporting the vehicle normally out of electrical contact with the ground, an electrically conducting mass of substantial electrical capacity, a seat for supporting a passenger out of electrical contact with the said mass, and a saran cover forming a surface for the seat, the saran cover for the surface of the seat being treated and covered with sorbitan monolaurate.

9. In a seat, a seat cover adapted to support a sitter, the said seat cover being substantially incapable of generating, inducing, and accumulating objectionable electrostatic charges.

SIMON A. SIMON.
ARTHUR H. DRELICH.

REFERENCES CITED

The following references are of record in the file of this patent:

UNITED STATES PATENTS

| Number | Name | Date |
|---|---|---|
| 1,781,034 | Russell | Nov. 11, 1930 |
| 2,228,948 | Field | June 14, 1941 |
| 2,297,135 | Davis | Sept. 29, 1942 |
| 2,403,960 | Stoops | July 16, 1946 |
| 2,418,752 | Brown | Apr. 8, 1947 |
| 2,461,043 | Eisen | Feb. 9, 1949 |